(12) United States Patent
Svetal (10) Patent No.: US 10,430,776 B2
(45) Date of Patent: Oct. 1, 2019

(54) SYSTEM AND METHOD FOR EXCEPTION HANDLING IN SELF-CHECKOUT AND AUTOMATED DATA CAPTURE SYSTEMS

(71) Applicant: Datalogic USA, Inc., Eugene, OR (US)

(72) Inventor: Michael P. Svetal, Eugene, OR (US)

(73) Assignee: DATALOGIC USA, INC., Eugene, OR (US)

( * ) Notice: Subject to any disclaimer, the term of this patent is extended or adjusted under 35 U.S.C. 154(b) by 0 days.

(21) Appl. No.: 14/593,139

(22) Filed: Jan. 9, 2015

(65) Prior Publication Data
US 2015/0193761 A1    Jul. 9, 2015

Related U.S. Application Data (60) Provisional application No. 61/925,590, filed on Jan. 9, 2014.

(51) Int. Cl.
| | |
|---|---|
| *G06Q 10/00* | (2012.01) |
| *G06K 15/00* | (2006.01) |
| *G06Q 30/06* | (2012.01) |
| *G07G 1/14* | (2006.01) |
| *G06Q 20/20* | (2012.01) |
| *G07G 1/00* | (2006.01) |
| *G07G 1/01* | (2006.01) |

(Continued)

(52) U.S. Cl.
CPC ......... *G06Q 20/208* (2013.01); *G07G 1/0036* (2013.01); *G07G 1/0054* (2013.01); *G07G 1/01* (2013.01); *G07G 3/006* (2013.01); *A47F 9/048* (2013.01)

(58) Field of Classification Search
CPC . G06K 9/00208; G07G 1/0036; G07G 1/0045
See application file for complete search history.

(56) References Cited

U.S. PATENT DOCUMENTS

| | | |
|---|---|---|
| 4,679,154 A | 7/1987 | Blanford |
| 4,850,009 A | 7/1989 | Zook et al. |

(Continued)

FOREIGN PATENT DOCUMENTS

| | | |
|---|---|---|
| EP | 2211153 | 7/2010 |
| JP | 3-238573 | 10/2001 |

(Continued)

OTHER PUBLICATIONS

US 8,348,169 B2, 01/2013, Wang et al. (withdrawn)

(Continued)

*Primary Examiner* — Talia F Crawley
(74) *Attorney, Agent, or Firm* — Stoel Rives LLP (57) ABSTRACT

A checkout system for data reading, and related methods of use, the checkout system including one or more data reading devices with a conveyor for transporting items toward a read zone of the data reading devices, and an exception identification system capable of identifying exception items transported through the read zone without being successfully identified by the data reader. An imaging system acquires one or more images of these exception items, and these images are presented to a user on a display screen, whereby the user manipulates the images of the exception items to associate the images with item information (such as item description, price, etc.) to clear any exception items.

20 Claims, 5 Drawing Sheets

(51) Int. Cl.
*G07G 3/00* (2006.01)
*A47F 9/04* (2006.01)

(56) References Cited

U.S. PATENT DOCUMENTS

| | | | |
|---|---|---|---|
| 4,939,355 A | 7/1990 | Rando et al. | |
| 5,115,888 A * | 5/1992 | Schneider | A47F 9/048 186/61 |
| 5,494,136 A | 2/1996 | Humble | |
| 5,497,314 A | 3/1996 | Novak | |
| 5,525,786 A | 6/1996 | Dumont | |
| 5,572,019 A | 11/1996 | Tsuyoshi | |
| 5,641,039 A | 6/1997 | Dumont | |
| 6,050,731 A | 4/2000 | Matsui | |
| 6,336,053 B1 | 1/2002 | Lennevi | |
| 6,396,516 B1 | 5/2002 | Beatty | |
| 6,540,143 B1 * | 4/2003 | Matsumori | G06K 7/14 235/382 |
| 6,687,580 B2 | 2/2004 | Iguchi et al. | |
| 6,711,293 B1 | 3/2004 | Lowe | |
| 6,827,266 B2 | 12/2004 | Mergenthaler et al. | |
| 7,010,501 B1 | 3/2006 | Roslak et al. | |
| 7,040,455 B2 | 5/2006 | Crockett et al. | |
| 7,059,527 B2 | 6/2006 | Mergenthaler et al. | |
| 7,066,388 B2 | 6/2006 | He | |
| 7,118,026 B2 | 10/2006 | Harris et al. | |
| 7,168,525 B1 | 1/2007 | Jacobs | |
| 7,207,477 B1 | 4/2007 | Ramachandran | |
| 7,209,891 B1 | 4/2007 | Addy et al. | |
| 7,325,729 B2 | 2/2008 | Crockett et al. | |
| 7,422,147 B2 | 9/2008 | Rosenbaum | |
| 7,448,542 B1 * | 11/2008 | Bobbitt | G06Q 20/208 186/61 |
| 7,461,785 B2 | 12/2008 | Crockett et al. | |
| 7,578,442 B2 | 8/2009 | Knowles et al. | |
| 7,599,543 B2 | 10/2009 | Jones et al. | |
| 7,602,956 B2 | 10/2009 | Jones et al. | |
| 7,660,739 B2 | 2/2010 | Fowler | |
| 7,905,412 B2 | 3/2011 | Maeda et al. | |
| 7,909,248 B1 * | 3/2011 | Goncalves | G07G 1/0063 235/375 |
| 8,033,470 B2 | 10/2011 | Maeda et al. | |
| 8,068,674 B2 | 11/2011 | Goncalves | |
| 8,072,651 B2 | 12/2011 | Bozzi et al. | |
| 8,196,822 B2 | 6/2012 | Goncalves | |
| 8,353,457 B2 | 1/2013 | Olmstead | |
| 8,396,278 B2 | 3/2013 | Jones et al. | |
| 8,430,311 B2 | 4/2013 | Ostrowski et al. | |
| 8,448,859 B2 | 5/2013 | Goncalves et al. | |
| 8,489,322 B2 | 7/2013 | Miyajima | |
| 8,539,385 B2 | 9/2013 | Capela et al. | |
| 8,657,196 B2 * | 2/2014 | Olmstead | G07G 1/0045 235/435 |
| 8,919,653 B2 * | 12/2014 | Olmstead | G06K 7/10544 235/462.11 |
| 9,082,142 B2 * | 7/2015 | Svetal | G06Q 30/06 |
| 9,110,925 B2 * | 8/2015 | Boncyk | G06K 9/228 |
| 2002/0148899 A1 * | 10/2002 | Brandt | G06K 7/14 235/462.12 |
| 2003/0047387 A1 | 3/2003 | Bogat | |
| 2003/0217892 A1 * | 11/2003 | Persky | A47F 9/048 186/68 |
| 2004/0084530 A1 * | 5/2004 | McQueen | G06K 7/10861 235/462.01 |
| 2004/0099741 A1 * | 5/2004 | Dorai | G06K 7/14 235/462.08 |
| 2006/0131402 A1 | 6/2006 | Crockett et al. | |
| 2006/0243798 A1 | 11/2006 | Kundu et al. | |
| 2006/0261157 A1 | 11/2006 | Kundu et al. | |
| 2006/0282331 A1 | 12/2006 | Jacobs | |
| 2007/0057049 A9 | 3/2007 | Kundu et al. | |
| 2008/0011846 A1 | 1/2008 | Cato | |
| 2008/0048029 A1 | 2/2008 | Crockett et al. | |
| 2008/0078833 A1 | 4/2008 | Crockett et al. | |
| 2008/0116278 A1 | 5/2008 | Epshteyn | |
| 2008/0308630 A1 | 12/2008 | Bhogal et al. | |
| 2009/0021375 A1 | 1/2009 | Stagg | |
| 2009/0039164 A1 | 2/2009 | Herwig et al. | |
| 2009/0084854 A1 | 4/2009 | Carlson et al. | |
| 2009/0212113 A1 | 8/2009 | Chiu et al. | |
| 2009/0218401 A1 * | 9/2009 | Moran | G06K 5/00 235/439 |
| 2010/0027894 A1 * | 2/2010 | Dahari | G06T 7/0008 382/218 |
| 2010/0059589 A1 | 3/2010 | Goncalves et al. | |
| 2010/0076855 A1 * | 3/2010 | Karnin | A47F 9/047 705/24 |
| 2010/0138304 A1 | 6/2010 | Boyarsky et al. | |
| 2011/0060426 A1 | 3/2011 | Morton | |
| 2011/0075931 A1 | 3/2011 | Chiou et al. | |
| 2011/0191196 A1 | 8/2011 | Orr et al. | |
| 2011/0279272 A1 | 11/2011 | Wieth et al. | |
| 2011/0286628 A1 | 11/2011 | Goncalves et al. | |
| 2011/0320296 A1 | 12/2011 | Edwards | |
| 2012/0153662 A1 | 6/2012 | MacNeil et al. | |
| 2012/0187191 A1 * | 7/2012 | Olmstead | G07G 1/0045 235/462.13 |
| 2012/0187195 A1 | 7/2012 | Actis et al. | |
| 2013/0020391 A1 | 1/2013 | Olmstead et al. | |
| 2013/0020392 A1 | 1/2013 | Olmstead et al. | |
| 2013/0175339 A1 * | 7/2013 | Svetal | G06Q 30/06 235/383 |
| 2013/0206838 A1 | 8/2013 | Nahill et al. | |
| 2013/0206840 A1 * | 8/2013 | Furlong | G06K 7/10722 235/470 |
| 2013/0223673 A1 | 8/2013 | Davis et al. | |
| 2014/0021258 A1 * | 1/2014 | Olmstead | G06K 7/10544 235/462.41 |
| 2014/0162602 A1 * | 6/2014 | Bombolowsky | H04W 12/12 455/411 |

FOREIGN PATENT DOCUMENTS

| | | |
|---|---|---|
| JP | 2006309264 A | 11/2006 |
| JP | 2013021519 | 1/2013 |
| KR | 10-2010-0126417 | 12/2010 |
| KR | 10-2011-0070991 | 6/2011 |
| KR | 10-2009-0121191 | 1/2013 |
| WO | WO 2002/037432 | 5/2002 |
| WO | WO 2007/038348 A1 | 4/2007 |
| WO | WO 2012/103139 | 8/2012 |
| WO | WO 2013/090023 | 6/2013 |
| WO | WO 2013/150604 | 10/2013 |

OTHER PUBLICATIONS

Evolution Robotics: *Brochure: ViPR® Giving Products the Ability to See*, downloaded from https://web.archive.org/web/20100710090822/http://www.evolution.com/core/ViPR/ (Internet Archive date Jul. 2010) visited Oct. 31, 2013.

International Searching Authority, International Search Report and Written Opinion for PCT/US2013/051042, dated Sep. 27, 2013.

* cited by examiner

SYSTEM AND METHOD FOR EXCEPTION HANDLING IN SELF-CHECKOUT AND AUTOMATED DATA CAPTURE SYSTEMS

RELATED APPLICATIONS DATA

This application is a nonprovisional of and claims the benefit under 35 U.S.C. § 119(e) of U.S. Provisional Patent Application No. 61/925,590, filed Jan. 9, 2014, the disclosure of which is incorporated by reference herein in its entirety.

BACKGROUND

The field of this disclosure relates generally to systems and methods of data reading, and more particularly, to systems and methods for identifying and resolving errors made during data reading.

Optical codes, such as barcodes, digital watermarks or other optically encoded information, encode optically-readable data about the objects to which they are attached or otherwise associated. Barcodes are found on or associated with objects of various types, such as on the packaging of retail, wholesale, and inventory goods; retail product presentation fixtures (e.g., shelves); goods undergoing manufacturing; personal or company assets; and documents. By encoding information, a barcode typically serves as an identifier of an object, whether the identification be to a class of objects (e.g., containers of milk) or to a unique item.

Various types of data readers, also known as scanners, such as manual readers, semi-automatic readers and automated readers, are available to acquire and decode the information encoded in optical codes. In a manual reader (e.g., a hand-held type reader, or a fixed-position reader), a human operator positions an object relative to the reader to read the optical code associated with the object. In a semi-automatic reader, either checker-assisted or self-checkout, objects are moved one at a time by the user into or through the read zone of the reader and the reader then reads the optical code on the object. In an automated reader (e.g., a tunnel or portal scanner), an object is automatically positioned (e.g., transported through the read zone via a conveyor) relative to the reader, with the reader automatically reading the optical code on the object when the object passes through the read zone.

In some instances, a data reader may encounter errors when attempting to read an optical code on an object or the reader may simply fail to read the optical code. For instance, in some cases a barcode may be obscured by neighboring items, or an item may be missing a barcode, or a barcode may be difficult to read due to label quality or specular reflection issues. When a read error or read failure occurs with a manual or semi-automatic reader, the human operator typically rescans the optical code or manually enters (e.g., via a keyboard) a number (e.g., a UPC number) corresponding to the object. In an automated self-checkout reader, the data reading system may need to determine whether an error or an unexpected event occurs and in response, take appropriate exception action to address the error. In some instances, this exception action may require scanning the item manually (e.g., such as by using a hand-held scanner) or require returning the item back on the conveyor belt for rescanning.

The present inventors have, therefore, determined that it would be desirable to have a data reading system with improved performance features for quickly identifying and addressing data-reading errors, also known as exceptions, to minimize or eliminate the need to rescan items or manually enter barcode data when data-reading errors occur. Additional aspects and advantages of such data reading systems will be apparent from the following detailed description of example embodiments, which proceed with reference to the accompanying drawings. Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, it should be understood that an automated checkout system in a retail establishment is merely one use for such a system and should not be considered as limiting. An automated checkout system with the characteristics and features described herein may alternatively be used, for example, in an industrial location such as a parcel distribution center (e.g., postal), warehouse, luggage distribution center, or in a retail goods distribution center.

Figure 1:
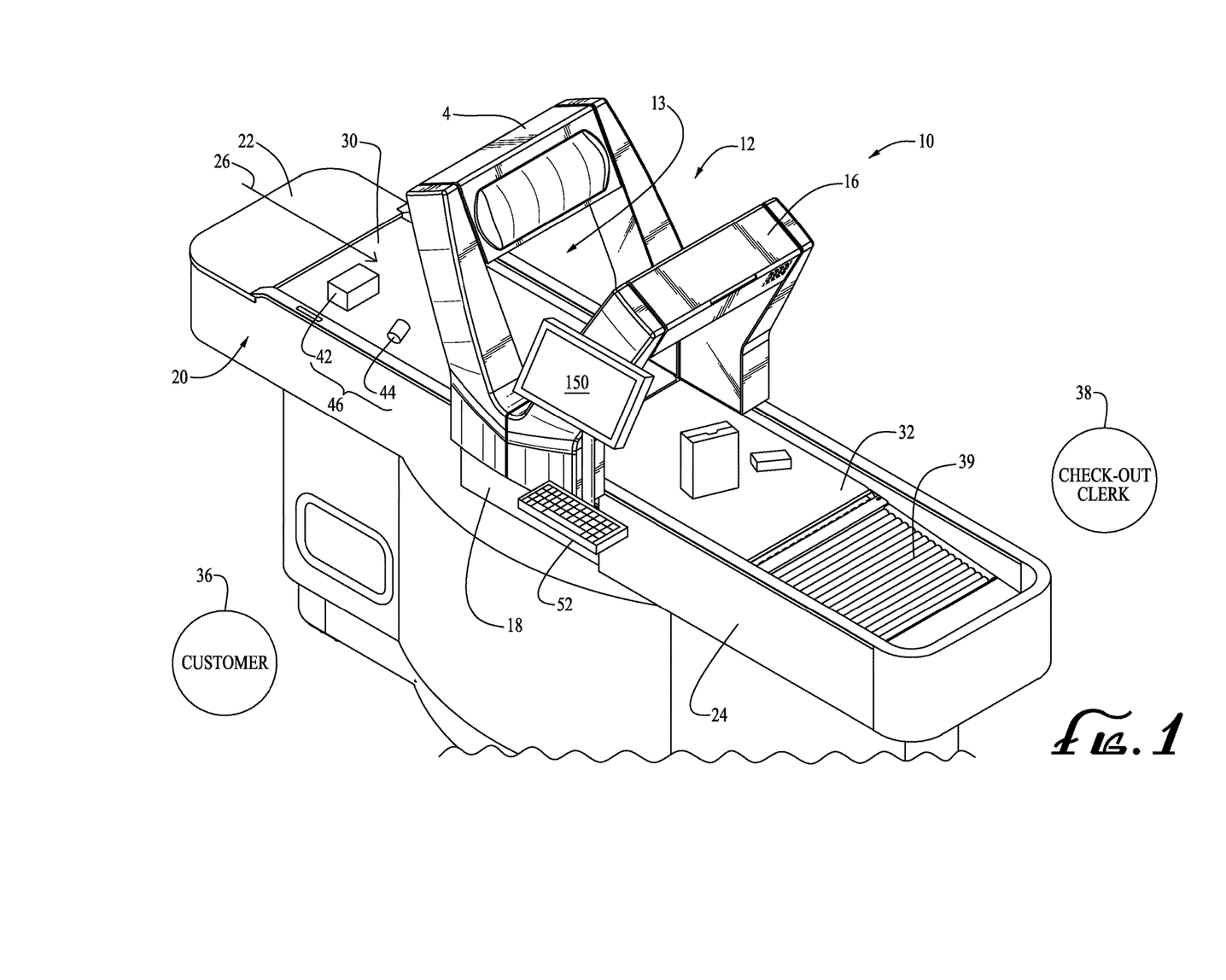
FIG. 1 is an isometric view of an automated data reading system, according to one embodiment.
Figure 2:
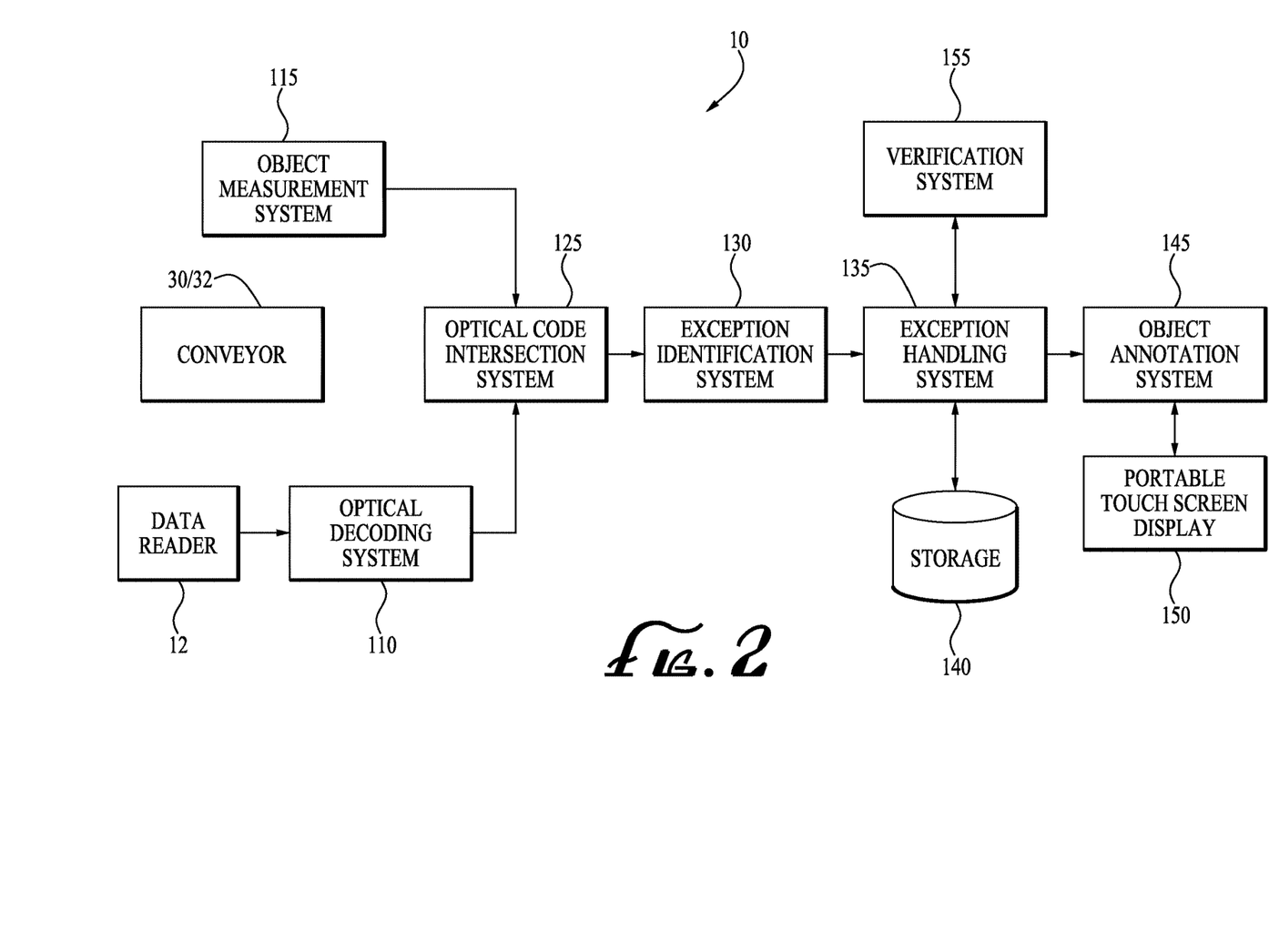
FIG. 2 is a block diagram of an automated optical code reading system, according to one embodiment.

FIGS. 1-2 collectively illustrate an automated checkout system 10 according to one embodiment. As is discussed in further detail below, the automated checkout system 10 may be used to identify an item or items 46 by reading and processing an optical code on the item(s) 46 (such as a package/box 42 and/or a can 44) during a checkout process in a supermarket or other retail establishment. It should be understood that in certain instances, item(s) 46 may refer to a single item or multiple items being transported and processed in the automated checkout system 10.

In an example operation, a user, which could be either a customer 36 or check-out clerk 38, (collectively/alternately referred to as a "user") places the item(s) 46 onto a leading conveyor section 30 that transports the item(s) 46 in a substantially linear direction of motion 26 toward a scanner unit 12. When the item(s) 46 pass through a read zone 13 of the scanner unit 12, various images of the items 46 are captured (including images of a bottom surface of the items 46 captured by a bottom scanner unit 18) and processed to read the barcode or capture other data from the items 46. The images of the items 46 may be presented to the customer 36 (or clerk 38) via a display 150 for verification and/or exception handling purposes as further described below. Thereafter, the items 46 transition onto a trailing conveyor section 32, which may deposit the items 46 into a bagging area 39 where the items 46 may be placed in a bag for the customer 36.

As mentioned previously, during some scanning operations, one or more of the items 46 may have an error (also referred to as an "exception" hereinafter) associated with them. When an exception occurs, barcodes or other data may not be captured for the item 46, which means the item 46 is not processed by the scanner unit 12. When exceptions occur, information relating to the exception is presented to the customer 36 (and/or clerk 38) on the display 150 so that the customer 36 can review and clear the exception (e.g., resolve the problem so that the item 46 is processed). Once all exceptions are cleared, the customer 36 pays for the purchased items 46 and completes the transaction. The following sections describe further details of the display 150 and processes associated with handling exceptions with reference to the figures.

With reference to FIG. 1, the automated checkout system 10 includes a scanner unit 12 installed on a checkout counter 20. The checkout counter unit 20 includes an inlet end 22 and outlet end 24, and the conveyor sections 30, 32 as described previously. Preferably, the conveyors 30, 32 operate at a constant speed, (e.g., 200-400 millimeters/second (mm/sec)), to optimize the performance of the scanner unit 12 and bottom scanner unit 18. The scanner unit 12 may include data capture devices 14, 16 in the form of arches extending over the conveyors 30, 32. Data capture devices 14, 16 include various components (such as data readers or imagers) for capturing images (such as top views, side views, etc.) or other information corresponding to the items 46 that are moved through a read zone 13 generally defined between the data capture devices 14, 16 of the scanner unit 12. Further details and example embodiments of a scanner unit 12 are described in U.S. Pat. No. 8,746,564, the disclosure of which is incorporated herein by reference. As mentioned previously, the automated checkout system 10 may include a bottom reader section 18 that reads the bottom side of items 46 as they are passed over the gap 31 between the conveyor sections 30, 32. Additional details and example embodiments of such an automated checkout system are further described in U.S. Patent Application Pub. No. 2012/0187195, the disclosure of which is incorporated herein by reference.

FIG. 2 is a block diagram illustrating various components of the automated checkout system 10 of FIG. 1, according to one embodiment. With reference to FIG. 2, the automated checkout system 10 includes (1) a conveyor or conveyor sections 30, 32 that move items 46 through the read zone 13 of the scanner unit 12 and bottom scanner unit 18; (2) the scanner unit 12 and bottom scanner unit 18 capture various images of the optical codes disposed on the items 46; (3) a decoding system 110 that processes and decodes the images acquired by the scanner units 12, 18; (4) and an exception identification system 130 operable to identify when an exception occurs.

In an ideal operation, the automated checkout system 10 successfully reads an optical code and correctly associates the optical code with a single item 46 passing through the read zone 13 of the scanner units 12, 18. However, in some instances, this ideal operation fails, thereby resulting in an exception. As is described in further detail below, various types of exceptions are possible during a typical checkout process. For example, one type of exception corresponds to an event in which an item 46 passes through the scanner units 12, 18, but an optical code from the item 46 is not successfully read. Another type of exception corresponds to an event in which an optical code is read, but the automated checkout system 10 does not detect that an item 46 has passed through the scanner units 12, 18. Another type of exception corresponds to an event in which one optical code read by the scanner units 12, 18 is associated with multiple items 46 passing through automated checkout system 10. Yet another type of exception corresponds to an event in which multiple different optical codes read by system 10 are associated with a single item 46 passing through automated checkout system 10. There are other types of exceptions as well as various subsets of the above-described exceptions that are possible and applicable to the systems/methods described herein even though they are not specifically described in detail.

It should be understood that automated checkout system 10 includes various modules or subsystems that perform various tasks. These subsystems are described in greater detail below. One or more of these systems may include a processor, associated software or hardware constructs, and/or memory to carry out certain functions performed by the systems. The processors of the systems may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

As mentioned previously, the scanner units 12, 18 are each operable to capture images of items 46 as the items 46 are transported along conveyor system 30, 32. The scanner units 12, 18 identify whether optical codes disposed on the items 46 are captured in the images and decode those optical codes that are captured. The scanner units 12, 18 may include different decoders (e.g., software algorithms, hardware constructs) to decode various types of optical codes including one-dimensional (e.g., linear) codes, (e.g., UPC, codabar, code 25, code 39, code 93, code 128, code 11, EAN8, EAN13, plessey, POSTNET) two-dimensional (e.g., matrix) codes (e.g., aztec code, maxicode, QR code, high-capacity color barcode, data matrix) and stacked codes (PDF417, GS1 Databar). In some embodiments, the automated checkout system 10 may include a separate optical decoding system 110 that receives and decodes the optical code from the scanner units 12, 18.

The automated checkout system 10 may include any of a number of suitable exception detection/determination systems. In one example exception detection system, an object measurement system 115 is positioned along conveyor system 30, 32 to measure items 46 that are transported along conveyor system 30,32. In one example configuration, the object measurement system 115 generates model data that represents three-dimensional models of the items 46 that are transported along conveyor system 30,32. Further details of an example object measurement system 115 are described in U.S. Application Pub. No. 2013/0020391, the disclosure of which is hereby incorporated by reference.

The scanner units 12, 18 are also operable to generate projection data for optical codes represented in the captured images. The projection data represents back projection rays that project into a three-dimensional view volume of the scanner units 12, 18. These back projection rays are associated with locations of the representations of the optical codes in the images. Details of an example embodiment of such a system are further described in U.S. Pat. No. 8,746,564, the disclosure of which was previously incorporated by reference.

In some embodiments, the automated checkout system 10 may also include an optical code intersection system 125 that is configured to receive the model data from object measurement system 115 and the projection data from the scanner units 12, 18. The optical code intersection system 125 uses the model data and the projection data to determine whether the back projection rays generated for decoded optical codes intersect with the three-dimensional models. Details of an example optical code intersection system 125 are described in U.S. Application Pub. No. 2013/0020391, the disclosure of which is hereby incorporated by reference.

In some embodiments, the automated checkout system 10 may include an exception identification system 130 in communication with the optical code intersection system 125. The exception identification system 130 identifies whether exceptions occur based on intersection determinations made by the optical code intersection system 125. For example, if an object passes through automated checkout system 10 and the object measurement system 115 generates a three-dimensional model of the object, but no back projection ray of an optical code intersects with the three-dimensional model, exception identification system 130 identifies this event as an exception. The exception identification system 130 may also be operable to classify and categorize exceptions by types and subtypes and to generate exception category identification information indicative of the exception types and/or subtypes. In other embodiments, exceptions may also be identified by comparing the dimensions or volume of the three dimensional item model to dimensions or volume values obtained from a stored list of dimension and volume values which are associated with specific bar code values or ranges of bar code values.

The automated checkout system 10 may also include an exception handling system 135 in communication with exception identification system 130. The exception handling system 135 determines how to handle or resolve an exception identified by the exception identification system 130 based on the exception's type. To this end, the exception category identification information generated by the exception identification system 130 is communicated to the exception handling system 135. The exception handling system 135 is operable to determine that an exception should be resolved in one of multiple ways. For example, the exception handling system 135 may determine that an exception is to be automatically resolved by ignoring the exception or manually resolved by an operator. The exception handling system 135 may communicate with a storage device 140 that stores various types of information associated with exceptions.

In some embodiments, the storage device 140 (or other database, not shown) may include a listing of all the barcodes associated with items 46 that may be available or in inventory for a given retail establishment. In such embodiments, the exception handling system 135 is operable to call up information on any item 46 based on its barcode and display that information for a user to assist in clearing exceptions. For instance, the exception handling system 135 may display the description and price of an item based on the captured barcode. In some instances, the scanner units 12, 18 may capture a partial barcode (such as when items 46 are too close and one item obscures the barcode of a neighboring item). In such instances, the exception handling system 135 may be configured to generate information for all barcodes that match the captured portion of the barcode and display all the potential matches on the display screen 150 for the user so that the exception may be cleared. Further details of such embodiments are described with reference to FIG. 3 below.

In some embodiments, the automated checkout system 10 may also include an object annotation system 145 that is operable to generate annotated image data corresponding to visual representations of exceptions to enable a user (e.g., a customer 36 or clerk 38) to easily identify which items 46 have exceptions associated with them. The annotated image data generated by object annotation system 145 are communicated to a display screen 150, which displays the visual representations of the exceptions. Further details and example embodiments of an exception handling system 135 and an object annotation system 145 are described in U.S. Application Pub. Nos. 2013/0020391 and 2013/0175339, the disclosures of which are hereby incorporated by reference.

Once the exception identification system 130 identifies an exception and generates the exception category identification information, the exception handling system 135 determines how to resolve the exception. Exceptions can be resolved in various ways, such as (1) ignore the exception, (2) automatically resolve the exception, and (3) manually resolve the exception (either by the customer 36 or clerk 38). The exception handling system 135 may be user-programmable to handle various exceptions in different ways. Various examples of an exception handling system 135 capable of automatically resolving exceptions (e.g., without input from the customer 36 or clerk 38) are described in U.S. Application Pub. Nos. 2013/0020391 and 2013/0175339, the disclosures of which were previously incorporated by reference. The following section describes an exception handling system 135 that accepts user input, such as via the touch screen display 150, to resolve various exceptions.

As described previously, in an example process of using the automated data capture system 10, the customer 36 places items 46 on the leading conveyor section 30, which transports the items 46 toward the scanner units 12, 18. Preferably, the items 46 are placed on the leading conveyor section 30 sequentially, in single file, to avoid the scanner units 12, 18 mistakenly reading multiple items as a single item. When the items 46 pass through a read zone 13 of the scanner units 12, 18, various images of the surfaces of the items 46 are captured and processed to decode the optical code. If the data capture process is determined to not have been successful for any reason (i.e., that an exception has occurred), then information about this failed attempt to capture the data is communicated to the customer 36 and/or to the checkout clerk 38 so that the exception can be managed.

One method for communicating this exception information is to provide one or more images (e.g., digital photographs) of the item(s) 46, a video of the item(s) 46, or a rotatable 3D image of the item 46, and any data that was captured but that was too ambiguous to determine if the data was correct. Typically, the images and (ambiguous) data are communicated or displayed to the user (e.g., customer 36 or clerk 38) via a display screen 150, which may comprise a touch screen. The user may review the information on the display screen 150 and interact with the display screen 150 via a keyboard/keypad 52 and/or by touching the display screen 150 with a finger, stylus, or other device. In some embodiments, the display screen 150 may include information regarding what kind of exception occurred, as well as other information regarding the item 46. The following section, with particular reference to FIG. 3, describes an example embodiment for handling exceptions using the touch screen 150.

Figure 3:
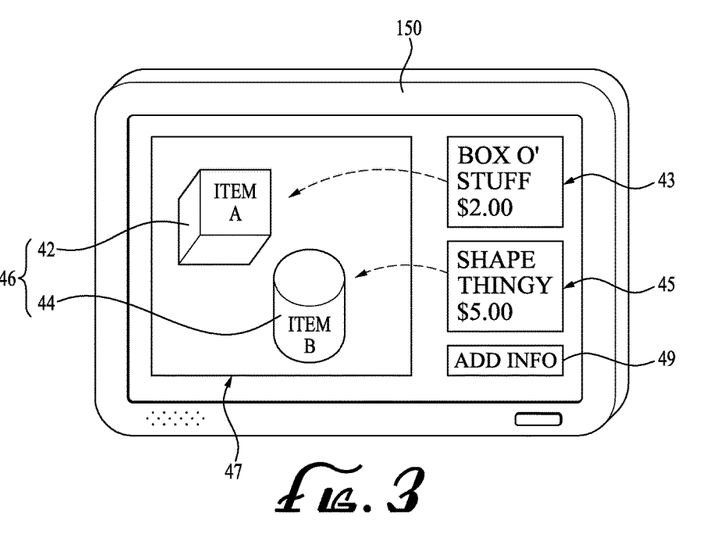
FIG. 3 is a schematic of an example display for associating items with their respective barcodes, according to one embodiment.

FIG. 3 illustrates a schematic of an example touch screen display 150 for associating items 46 with their respective barcodes to address exceptions. With reference to FIG. 3, during or after completion of the scanning process of items 46, exception identification system 130, exception handling system 135, or any other system (or combination of various systems) of the automated checkout system 10 communicates to the display 150 information (e.g., identification of the item, an image or video of the item, etc.) relating to the items 46 that have an exception associated with them (also referred to as exception items). Upon receiving the information, the display 150 presents an image or images 47 of the exception items 46 along with other information received from the exception identification system 130 or exception handling system 135). For example, with reference to FIG. 3, an image 47 of box 42 and can 44 is presented on the display 150, indicating that these items may have exceptions associated with them (such as no barcode captured, partial barcode captured, or any of multiple exceptions described previously). Along with the image 47 of the exception items 46, the display 150 may include additional item information 43, 45 (e.g., item description, pricing, weight, etc.). As described previously, this item information 43, 45 may be stored in the storage device 140 (or another database) and called up by the exception handling system 135 (or other system) based on captured portions of the barcode, partial images of the exception items, weight of the exception item, or any other captured data associated with the exception item. Because the item information 43, 45 is generated from partial data that may have been captured during the scanning process, the item information 43, 45 displayed on the screen 150 may or may not relate to the exception items 42, 44.

After the user is presented with the image(s) 47 of the exception items 46 and the item information 43, 45, the user reviews the image(s) 47 and the item information 43, 45 and determines whether the images 47 match any of the item information 43, 45 displayed on the screen 150. If any information matches an item, the user may match the item information with the corresponding image of the item to clear the exception. For example, the user may determine that item 42 matches item information 43. In such instances, the user selects the item information 43 (or an icon associated therewith) on the touch screen 150 and drags the item information 43 toward the image 47 of the item 42 (or vice-versa), or toward another designated location associated with item 42 to clear the exception. In other embodiments, the user may simply touch the image of the item 42 on the display screen 150, and touch the matching item 43 to clear the exception.

In some embodiments, once the item information 43 has been associated with the item 42, the image 47 may be altered to alert the user that the exception associated with the item 42 has been cleared. For instance, a colored box may appear around item 42, the item 42 may be grayed or shaded, and/or a dot, check mark, or other visual indicator may appear on or next to the item 42 on the screen 150.

The user continues the matching process with the other items 46 presented on the display 150 until all items 46 with an exception have been cleared. Once all items 46 are successfully cleared, the display 150 (or other system) may inform the user that all exceptions have been cleared and may present payment information to the user to complete the transaction. It should be understood that in the case of non-touch screen displays 150, the user may instead use voice commands, a mouse, keyboard, or other suitable peripheral input device to match the information with the items 46 to clear exceptions.

In some embodiments, such as an example exception where multiple items 46 are positioned close together on the conveyor 30, the scanner units 12, 18 may capture images of all the items 46 passing through the respective read zone, but may fail to capture an equal number of barcodes (e.g., one or more of the barcodes may be obscured by other items). In such instances, the display 150 may present fewer barcodes (or other item information) than the number of images of items 46.

For example, a user may purchase five items and place them on the conveyor 30 toward the scanner units 12, 18. Because some of the items 46 are bunched together, the scanner units 12, 18 may capture images for five individual items 46, but only four barcodes. In such cases, the images for the items 46 and any information for the barcodes are presented to the user to match using a drag-and-drop technique or a matching technique as described previously. In the above five-item example, once all the four barcodes are matched with the corresponding four items, one item 46 remains without a matching barcode. In such cases, the unmatched item 46 identified on the display 150 may be removed by the user and returned to the leading conveyor section 30 for reprocessing, or the exception may be cleared in another fashion, such as automatically by the exception handling system 135, manually via a handheld scanner (e.g., by scanning the item itself or by scanning a barcode on a separate list), or manually by the user via a keypad or a selection (virtual) button on the display 150 to present a virtual keypad for manual keying. In other embodiments, the display 150 may include a selectable menu item 49 that allows the user to search the storage device 140 (or other database) for the product name or other information for the unmatched item 46. Once the information is located, the information may be displayed on the display 150 and the user may match the information to the now-identified item in a similar fashion as described above.

Figure 4:
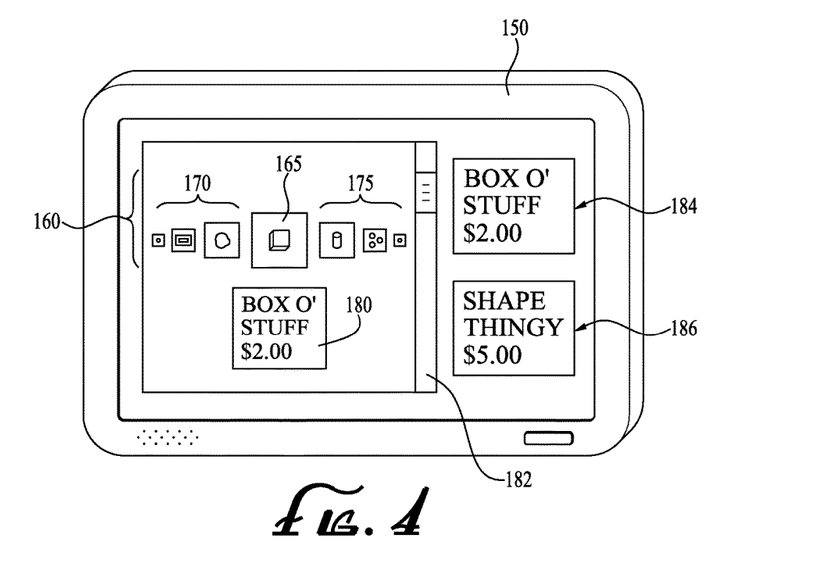
FIG. 4 is a schematic of an example display for associating items with their respective barcodes, according to another embodiment.

FIG. 4 illustrates a schematic of an example touch screen display 150 for associating items 46 with their respective barcodes, according to another embodiment. With reference to FIG. 4, the display 150 may present to the user images associated with an exception along with a select number of images (which may not be associated with an exception) taken before and after the exception images to provide the user with a collection of images 160 to review and clear. For instance, in one embodiment, the display 150 may present an exception image 165 of the box 42 along with images 170 of the previous three items preceding the box 42 and images 175 of the subsequent three items following the box 42. The collection of images 160 may be presented in an animated file, such as a .gif or .avi file, that the user can scroll through to review the images preceding and following an exception. In some instances, since the scanner units 12, 18 may capture images of an item 46 from various angles, each of the images 165, 170, 175 may be selected and manipulated by the user (e.g., the user may select a back view of the image, or a bottom view of the image, etc.) to help identify the exception item. Once the exception item has been identified, the user may review or scroll, such as via a scroll bar 182, through the information 184, 186 to select the correct information 184, 186 relating to the image to clear the exception in a drag-and-drop process as described previously or any other suitable matching process. As described previously with reference to FIG. 3, this item information 184, 186 may be stored in the storage device 140 (or another database) and called up by the exception handling system 135 (or other system) based on captured portions of the barcode, partial images of the exception items, weight of the exception item, or any other captured data associated with the exception item.

In some embodiments, the display 150 may include an item information box 180 (e.g., item description, pricing, etc.) displaying information associated with each of the items 46 in the collection of images 160. When the user clears the exception, the information for the exception item 46 may appear in the item information box 180 so that the user is aware that the exception has been cleared. Preferably, only the image being viewed (e.g., the center image in the collection 160) has associated information in the information box 180 presented on the display 150 so as to avoid potentially confusing the user or cluttering the display 150 (though the display 150 may show image item information for all or a subset of items in the collection of images 160). As the user scrolls through the images 165, 170, 175, the information in the item information box 180 changes to correspond with the image being viewed on the display 150.

In some embodiments, such as where no information has been captured for the exception item, the item information box 180 may be blank or may present a "NO INFORMATION" message to alert the user that no information is currently associated with the item. In such embodiments, the item information box 180 may remain blank until item information (e.g., information 184, 186) has been assigned to clear the exception item. As described previously, to clear the exception, the user may review and select item information 184, 186, and associate the information with the exception image 165, such as by dragging the item information 184, 186 into the item information box 180.

In some instances, it may be advantageous to present the user with a collection of images 160 (including the exception image 165 and other non-exception images 170, 175) along with the captured information presented in the information box 180 for each of the items to help verify that the automated checkout system 10 has correctly identified the exception image 165. In some cases, for example, the automated checkout system 10 may determine that an exception occurred, but may flag the wrong item. For instance, the display 150 may present the user with an exception image for box 42 because no barcode was detected (see FIG. 3). When the user scrolls through the collection of images 160, the user may determine that the barcode for box 42 was properly captured, but incorrectly associated with can 44. Accordingly, can 44 should have been flagged as the exception item.

On the display 150, the user may swap the information from can 44 and associate it with box 42 to begin resolving the exception. In some embodiments, the user may disassociate the barcode or item information from can 44 by single- or double-tapping (or applying any other suitable control gesture) the item information box 180 to unlock the information. Thereafter, the user may scroll through the collection of images 160 and find the image of the box 42, and then single- or double-tap the item information box 180 to associate the information with the box 42. Once the information has been corrected, the automated checkout system 10 may be updated to reflect that the exception occurred for can 44. At this point, the can 44 may be reprocessed to clear the exception associated with it or the user can review/scroll through the other information 184, 186 to determine whether a match for the can 44 is available. In other embodiments, the reassignment process may be performed differently. For example, in some embodiments, a virtual button or selectable menu option on the display 150 may be selected to present a screen with images for various items and their associated information. From this screen, the user may select and swap barcodes between items as desired.

The collection of images 160 also helps the user ensure that the automated checkout system 10 associated the proper barcodes with each of the remaining items 46 for which an exception was not identified. If the user finds an error while scrolling through the images in the collection of images 160, the user may disassociate any information 180 from one of the images and swap that information 180 with that of another image, or discard the information 180 entirely and use the scroll bar 182 to substitute the correct information 184, 186 for the item.

Turning back to FIG. 2, the automated checkout system 10 may include a verification system 155 in communication with the exception handling system 135. The verification system 155 is configured to verify the accuracy of the exceptions handled by the user via the display 150 to help detect user error and/or intentionally fraudulent transactions (e.g., the user may try to associate an expensive item with a barcode for an inexpensive item).

In some embodiments, the verification system 155 may compare the exception image to a matching or similar stock image (with a known barcode) of the item stored in the storage 140. If the barcode/information associated with the stock image does not match the barcode selected by the user, the display 150 may alert the customer 36 and/or the clerk 38 of the possible mistake.

For instance, in some embodiments, the verification system 155 may compare visual recognition features (such as scale-invariant feature transform (SIFT)) from the captured image(s) of the exception items 46 with visual features or markers for known items (e.g., all inventory items) in the storage 140. After the user enters the information 180 on the display 150 to handle any exceptions, the verification system 155 may query the storage 140 in search of one or more items that may be a likely match to the exception item 46 based on the captured visual recognition features. Thereafter, the verification system 155 compares the barcode information 180 input by the user on the display 150 with the barcode information for any matching items returned by the query. If the verification system 155 determines that the input information 180 matches the stored information in the storage 140 for at least one known item, then the verification system 155 may verify that the exception was properly handled by the user. If no matches are found, then the verification system 155 may alert the user, such as via a message delivered on the display 150, that the exception was not properly handled. In such instances, the automated checkout system 10 may request review and clearance by authorized personnel. (e.g., the clerk 38). Additional details of feature comparison and object recognition are described in U.S. Patent Application Publication No. 2011/0286628, titled, "Systems and Methods for Object Recognition Using a Large Database," the disclosure of which is hereby fully incorporated by reference. Additional details relating to a method of object recognition is described in U.S. Pat. No. 6,711,293, titled, "Method and Apparatus for Identifying Scale Invariant Features in an Image and Use of Same for Locating an Object in an Image," the disclosure of which is hereby fully incorporated by reference In other embodiments, select items (e.g., expensive items with a price threshold over $100, for example) may include special visible markings or electronic tags that may be captured by the data reading devices 12, 18, the object measurement system 115, or another system of the automated checkout system 10 during item processing. When an exception occurs, the user may clear the exception via the display 150 via any of the processes described previously. In verifying the user selection, the verification system 155 may communicate with the object measurement system 115 (or another system) to determine whether the exception item bears the special visible marking or electronic tag. If the item bears the special visible marking or electronic tag, the verification system 155 may consider the user-selected barcode and determine whether the barcode matches an item for the price threshold of over $100. If the barcode does not match an item over $100 (e.g., the user-selected barcode is for an item that costs $10.99), then the verification system 155 may alert the user and/or the clerk 38 of the error and may require further processing.

In yet another embodiment, when a user attempts to clear an exception via the display 150, the item dimensions or volume from the three dimensional item model may be compared to a database that associates dimensional or volume data with items and their respective bar codes. When expected dimensional or volume information from the selected item does not match the data from the three dimensional item model of the exception item, the verification system 155 may alert the user and/or the clerk 38 of the error and further processing may be required.

Figure 5:
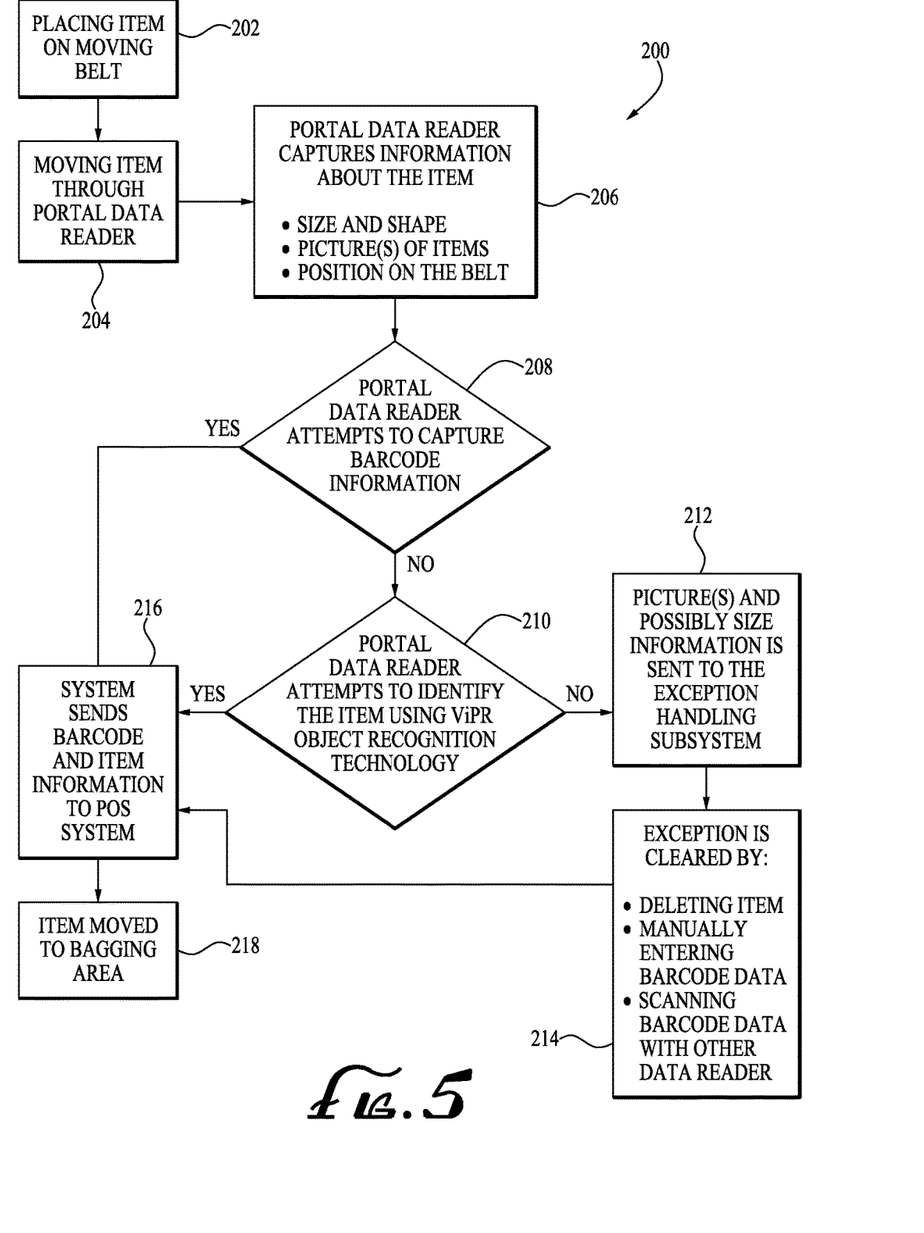
FIG. 5 is a flowchart of a process performed by an exception handling system of the automated data reading system of FIG. 1.

FIG. 5 is a flowchart of an example exception handling method 200 according to one embodiment, comprising the following steps.

Step 202, placing item(s) on the moving conveyor.

Step 204, via the conveyor, moving the item through a read region of the data reading devices.

Step 206, via the data reading devices, capturing information about the item:
 object size and shape;
 capturing a picture/image of the item;
 position of the item on the conveyor.

Step 208, via the data reading devices, attempting to capture optical code information from the item. If successful in capturing and reading/decoding, proceeding to Step 216; if unsuccessful, proceeding to Step 210. The data reading devices may include a separate optical code reading mechanism, or the image(s) captured of the item may be processed to detect and decode optical code(s) present in the images.

Step 210, via the data reading devices, attempting to identify the item using object recognition techniques such as ViPR® object recognition technology available from Datalogic ADC, Inc. of Eugene Oregon. This type of object recognition employs identification of scale-invariant feature transformation (SIFT) features on the objects to perform object recognition. However, other forms of object recognition such as SURF (speeded up robust features) and BOLD (bunch of lines descriptor) can also be used. If YES, proceeding to Step 216; if NO, proceeding to Step 212 (Exception handing).

Step 212, from an unsuccessful identification at Step 210, sending exception information (such as digital photographs and item size information) to the exception handling subsystem (Step 214) for handling.

Step 214, clearing the exception via any of the following steps:
 deleting the item from the transaction and providing instructions to the customer 36;
 manually entering optical code data either from direct view of the item itself, or optionally by examining the digital photograph of the item;
 scanning the optical code on the item with another data reader, such a handheld device
 displaying the images of the exception item on the display for the user and having the user match barcode data to the exception image.
 Once the exception is cleared, proceeding to Step 216.

Step 216, from a successful item identification from either Step 208 or Step 210, or successful exception clearance at Step 214, sending optical code and/or item information to the POS system; proceeding to Step 218.

Step 218, via the downstream conveyor section 32, moving the item to the bagging area 39.

Information corresponding to the way in which the operator resolves the exception may be stored in storage device 140 for future reference and use by the exception handling system 135. Additionally, the exception category identification information may be stored in storage device 140. In some embodiments, the exception handling system 135 is configured to analyze the information stored in storage device 140 corresponding to resolution of prior exceptions to determine whether to modify how future exceptions (e.g., future exceptions with the same category label) are to be resolved. Further details and examples of such embodiments are described in U.S. Pat. App. Pub. No. 2013/0175339, the disclosure of which was previously incorporated by reference.

It is intended that subject matter disclosed in portion herein can be combined with the subject matter of one or more of other portions herein as long as such combinations are not mutually exclusive or inoperable. In addition, many variations, enhancements and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated optical code reading and control system, comprising
 a data reader having a read zone;

a conveyor system configured to transport one or more items through the read zone of the data reader, the data reader configured to read optical code data on the one or more items and to identify the one or more items during a reading process as the one or more items pass through the read zone;

a storage device in operable communication with the data reader, the storage device having stored therein a set of item data for each of the one or more items, the set of item data being retrievable from the storage device via the optical code data;

an exception identification system configured to detect an exception item from the one or more items that have been transported through the read zone, the exception item being a transported item that was not successfully identified by the data reader;

an imaging system configured to acquire an image of the exception item;

an exception handling system in operable communication with the exception identification system and the storage device, the exception handling system configured to query the storage device and retrieve one or more sets of item data for items determined by the exception handling system to be potential matches for the exception item;

a processor configured to receive the one or more sets of item data for the items determined to be potential matches for the exception item, and to generate one or more selectable icons for the items determined to be potential matches for the exception item; and a display having a display screen, the display in operable communication with the processor and the imaging system, the display screen configured to: (a) present the image of the exception item, (b) present the one or more selectable icons generated by the processor, and (c) receive input from an operator for associating the image of the exception item with one of the one or more selectable icons to resolve the exception for the exception item with the item associated with the selection icon.

2. The system of claim 1, wherein the display screen comprises a touch screen, and wherein either or both of the image of the exception item and the one or more selectable icons are movable on the touch screen to a designated spot for associating the image of the exception item with the one of the one or more selectable icons.

3. The system of claim 1, wherein the display screen is further configured to simultaneously present an image for each of a plurality of exception items, and wherein the display is further configured to receive input to associate the image for each of the plurality of exception items with a corresponding one of the one or more selectable icons for items determined by the exception handling system to be potential matches for each of the plurality of exception items.

4. The system of claim 1, wherein the imaging system is configured to acquire a collection of images including a first image of a first non-exception item and a second image of a second non-exception item, wherein the first and second non-exception items correspond to items determined to be successfully identified by the data reader, and wherein the display is further configured to display the collection of images on the display screen together with the image of the exception item.

5. The system of claim 1, wherein the image of the exception item includes multiple views of the exception item captured by the data reader, and wherein the display is further configured to present each of the multiple views of the exception item and receive input for selecting and manipulating between the multiple views of the exception item on the display.

6. The system of claim 4, wherein the display is configured to present item information for each image in the collection of images, and wherein the display is further configured to receive input for manipulating the item information for each image in the collection of images to swap association of the item information from the first non-exception item to be associated with the exception item such that the exception item is turned into a non-exception item and the first non-exception item is turned into an exception item.

7. The system of claim 1, further comprising:
a database having stored therein stock item information for the exception item; and
a verification system in communication with the database, the verification system configured to query the database, compare the stock item information for the exception item with the received input for associating the image of the exception item with one of the one or more selectable icons, and determine whether the received input corresponds to the stock item information for the exception item.

8. A method of operation for an automated data reading system, the method comprising:
transporting, via a conveyor, one or more items along an item path through a read zone of a data reader;
reading and identifying, via a data reader, optical code data on the one or more transported items during a reading process as the one or more items pass through the read zone;
detecting, via an exception identification system, an exception item from the one or more items that have been transported through the read zone of the data reader, the exception item being a transported item that was not successfully identified by the data reader;
capturing, via an imaging system, an image of the exception item as the exception item is moved along the item path through the read zone;
querying, via an exception handling system, a storage device having stored therein a set of item data for each of the one or more items;
retrieving, via the exception handling system, one or more sets of item data for items determined by the exception handling system to be potential matches for the exception item;
receiving, via a processor, the one or more sets of item data for items determined by the exception handling system to be potential matches for the exception item;
generating, via the processor, one or more selectable icons, each selectable icon associated with one of the one or more sets of item data for items determined by the exception handling system to be potential matches for the exception item;
displaying, via a display system, the image of the exception item on a display screen;
displaying, via the display system, the one or more selectable icons generated by the processor for items determined by the exception handling system to be potential matches for the exception item; and
resolving the exception by receiving input from the operator via the display screen for associating the image of the exception item with one of the one or more selectable icons displayed on the display screen.

9. The method of claim 8, wherein displaying the image of the exception item and item information of the exception item on the display screen further comprises simultaneously displaying an image for each of a plurality of exception items, and wherein resolving the exception by receiving input comprises receiving input to associate the image for each of the plurality of exception items with a corresponding one of the one or more selectable icons for items determined by the exception handling system to be potential matches for each of the plurality of exception items.

10. The method of claim 8, further comprising:
acquiring, via the imaging system, a collection of images including a first image a first non-exception item and a second image of a second non-exception item, the first and second non-exception items correspond to items successfully identified by the data reader; and
displaying, via the display screen, the collection of images together with the image of the exception item.

11. The method of claim 10, wherein the image of the exception item includes multiple views of the exception item captured by the data reader, and wherein resolving the exception by receiving input further includes selecting and manipulating between the multiple views of the exception item on the display screen.

12. The method of claim 8, further comprising:
receiving, via a verification system, feedback relating to the input for associating the image of the exception item with one of the one or more selectable icons; and
assessing an accuracy of the input based on the feedback.

13. The system of claim 1, wherein the image of the exception item presented on the display screen is a rotatable three-dimensional image.

14. The method of claim 8, wherein the image of the exception item presented on the display screen is a rotatable three-dimensional image.

15. The system of claim 1, wherein the processor is incorporated within the exception handling system.

16. The system of claim 6, wherein the item information includes at least one of item description, item pricing, or item weight.

17. The system of claim 1, wherein the exception handling system is configured to determine items to be potential matches for the exception items based, at least in part, on a partial decoding of an optical code located on the exception item captured by the data reader.

18. The system of claim 1, wherein the exception handling system is configured to determine items to be potential matches for the exception items based, at least in part, on analyzing a partial image of the exception item captured by the data reader.

19. The system of claim 1, wherein the exception handling system is configured to determine items to be potential matches for the exception items based, at least in part, on a weight of the exception item determined by the data reader.

20. The method of claim 10, further comprising:
presenting item information for each image in the collection of images; and
receiving an input to swap association of the item information from the first non-exception item to be associated with the exception item such that the exception item is turned into a non-exception item and the first non-exception item is turned into an exception item.

* * * * *